United States Patent [19]

Christoffersson

[11] Patent Number: 5,477,113

[45] Date of Patent: Dec. 19, 1995

[54] APPARATUS FOR APPLYING A VARIABLE VOLTAGE TO AN ELECTRIC LOAD

[75] Inventor: Per M. Christoffersson, Halmstad, Sweden

[73] Assignee: Toroid Hong Kong Limited, Hong Kong, Hong Kong

[21] Appl. No.: 316,484

[22] Filed: Sep. 30, 1994

[51] Int. Cl.⁶ ............................................. H05B 37/02
[52] U.S. Cl. .......................... 315/278; 323/341; 307/140; 315/284; 336/150
[58] Field of Search ..................... 315/284, 285, 315/286, 278, 276, 279, 362; 307/128, 126, 140, 130, 131; 336/150; 323/340, 341, 255

[56] References Cited

U.S. PATENT DOCUMENTS

| | | | |
|---|---|---|---|
| 652,707 | 6/1900 | Wurts | 315/362 |
| 2,381,768 | 8/1945 | Minneci | 323/340 |
| 3,011,095 | 11/1961 | Kriechbaum | 315/284 |
| 3,331,013 | 7/1967 | Cunningham | 323/22 |
| 4,117,376 | 9/1978 | Andrews | 315/200 R |
| 4,574,223 | 3/1986 | Pitel | 315/284 |
| 4,591,765 | 5/1986 | Beck | 315/361 |
| 4,651,061 | 3/1987 | Spissinger | 315/200 R |
| 4,802,073 | 1/1989 | Plumly | 315/362 |
| 4,837,455 | 6/1989 | Sleator | 307/38 |
| 5,194,781 | 3/1993 | Konopka | 315/362 |
| 5,208,516 | 5/1993 | Saidian | 315/362 |
| 5,239,205 | 8/1993 | Hoffman et al. | 307/117 |
| 5,361,019 | 11/1994 | Angott et al. | 315/362 |

FOREIGN PATENT DOCUMENTS

| | | | |
|---|---|---|---|
| 488002 | 6/1992 | European Pat. Off. | 315/362 |

*Primary Examiner*—Robert J. Pascal
*Assistant Examiner*—Michael Shingleton

[57] ABSTRACT

An apparatus for applying a variable voltage to an electric load utilizes a transformer with several taps to provide different voltage levels for the load. The load is connected to alternate taps by a switching device, which is operated by a control device responsive to short interruptions in the power supply to the load. Short interruptions in power can be generated by rapidly turning one or more existing power switches in circuit with the load off and on again, so remote control is possible from several locations. Apparatus with the above structure is particularly suitable while employing a toroidal transformer for dimmer control of halogen lamps.

18 Claims, 2 Drawing Sheets

APPARATUS FOR APPLYING A VARIABLE VOLTAGE TO AN ELECTRIC LOAD

BACKGROUND OF THE INVENTION

The present invention relates to remote control of a voltage applied to an electric load, and specifically to dimming of a halogen lamp by means of an on/off switch in the lamp circuit.

It is well known in the art that the light output from an incandescent lamp can be varied by changing the voltage applied to the lamp. Known lamp dimmers generally use a remote potentiometer, which controls the conduction angle of a triac in the AC circuit of the lamp. A triac is a solid state switch similar to a thyristor.

U.S. Pat. No. 4,837,455 to Sleator describes how separate loads controlled by electromagnetic relays, solid state switching devices, or electrothermal relays can be selected remotely by flipping an on/off switch common to all the loads rapidly off and on again. An incandescent lamp is described as a possible load, but Sleator contemplates only on/off switching of the lamp.

Today, there are devices on the market that use rapid operation of an on/off switch for remote control purposes of lamps. One such device, which is designed to be inserted between an ordinary light bulb and a light bulb socket, makes it possible to switch the lamp from burning steadily to flashing by flipping an on/off switch in the lamp circuit off and then immediately on again. Another device of similar construction makes it possible to dim a lamp in one or more steps by rapid operation of an on/off switch.

All the known devices for dimming of a lamp use triacs to control the current flow in the lamp circuit. Triac based dimmers produce high frequency noise, which must be filtered out to avoid radio and TV interference, and they also generate undesirable DC components in the AC circuit.

Halogen lamps are low voltage devices, so they require a transformer between the house power and the light bulb. Toroidal transformers are the preferred type of transformers for halogen lamps, because they are small and light weight so that they are easy to locate in the lamp armature. A toroidal transformer has a core of toroidal configuration made by a tape-wound strip of electrical steel. Primary and secondary windings are threaded through the central opening in the toroidal core and distributed evenly along the circumference of the core. Toroidal transformers have air gap free cores, so they are sensitive to DC components in the transformer circuit. A triac based dimmer, which generates DC components, is accordingly not a viable option for control of halogen lamps with toroidal transformers.

SUMMARY OF THE INVENTION

It is a main object of the present invention to provide an inexpensive and efficient apparatus for remote control dimming of low voltage halogen lamps supplied by transformers.

It is a further object of the present invention to provide an apparatus for remote control dimming of halogen lamps, which does not cause DC components or high frequency noise in the AC circuit.

It is another object of the present invention to provide an apparatus for remote dimming of a halogen lamp that can be installed in the lamp armature, but can be operated remotely by an on/off switch in the power supply to the lamp.

It is a still further object of the invention to provide a new and inexpensive apparatus for applying a variable voltage to an electric load supplied by a transformer, using an on/off switch in the circuit as a control element.

Additional objects and advantages of the invention will be set forth in part in the description which follows, and, in part, will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF PREFERRED EMBODIMENTS

Reference will now be made in detail to the present preferred embodiments of the invention, examples of which are illustrated in the accompanying drawings.

Figure 1:
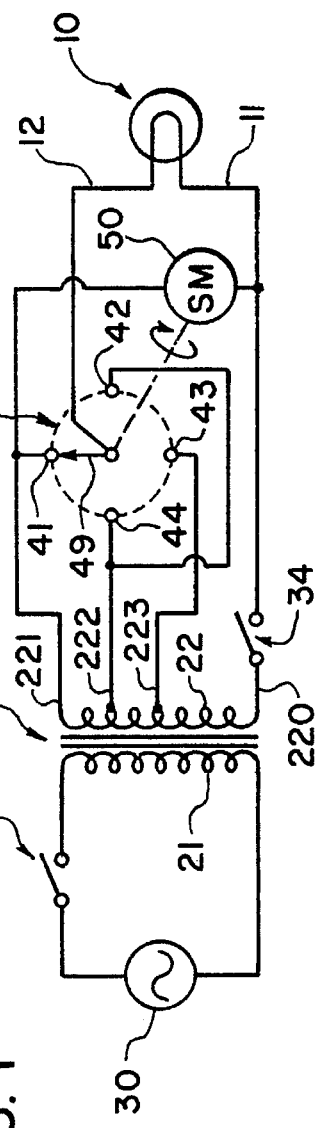
FIG. 1 is a schematic diagram for a device according to a first preferred embodiment of the invention for dimming of a low voltage lamp with a stepper motor as an actuator.

FIG. 1 is a schematic for a low voltage lamp including a dimmer apparatus according to a preferred embodiment of the invention. A low voltage light bulb 10, e.g. a 12 volt halogen light bulb, is supplied with household power 30 via a transformer 20. A first on/off switch 32 is connected in series with a primary winding 21 of the transformer 20. This switch 32 is usually a wall mounted switch controlling power to a wall outlet, A second, separate on/off switch 34 is installed in the lamp armature. This second switch is usually a conventional switch in the primary circuit of transformer 20, but it may also be a low voltage switch 34 connected between one end 220 of the secondary winding 22 and one terminal 11 of the light bulb 10, as shown in FIG. 1.

The other terminal 12 of the light bulb 10 is connected via a switching device 40 to secondary taps 221, 222, 223 on the secondary winding of the transformer 20. Tap 221 would have a rated voltage of 12 V AC for supply of a 12 V halogen bulb, and taps 222 and 223 would typically have rated voltages of about 10 V and 8 V, respectively.

The switching device 40 is a rotary switch with fixed contacts 41, 42, 43, 44 and a movable contact 49. Fixed contacts 41 and 43 are connected to taps 221 and 223 respectively, while fixed contacts 42 and 44 are both connected to tap 222. The movable contact 49 in the switching device 40 is operated by a stepping motor 50 with ¼ turn step angle. Alternatively, the stepping motor could be replaced by a solenoid operated ratchet drive. The stepping motor 50 is powered by the voltage between tap 221 of the secondary winding 22 and lead 11 on the light bulb 10, so its power is on only when the light bulb 10 has power. Both the switching device 40 and the stepping motor 50 are built into the lamp armature.

The lamp is turned on as usual by closing both switches 32 and 34. When the switching device 40 is in the position shown in FIG. 1, terminal 12 of the light bulb 10 is connected to the outer tap 221 in the secondary winding 22 via the movable contact 49 and the fixed contact 41 in the switching device 40. The light bulb 10 will thus be connected to the maximum secondary voltage (12 V), and will shine with maximum brightness.

The stepping motor 50 remains stationary as long as the voltage to its armature remains constant, but it will move one step forward every time its armature voltage is interrupted and then restored. The stepping motor will thus move one step forward whenever one of the on/off switches 32, 34 is turned off and then on again.

When one of the on/off switches 32, 34 is first opened and closed again, the movable contact 49 will be turned clockwise to contact fixed contact 42, so terminal 12 of the light bulb 10 is moved from tap 221 to tap 222, which has lower voltage than tap 221 (e.g. 10 V). The light bulb 10 will thus be dimmed by a first step whenever either of the on/off switches 32, 34 is first opened and closed again.

A second opening and closing of either on/off switch 32, 34 will advance the stepping motor one more step, so the movable contact 49 makes contact with fixed contact 43. The light bulb 10 will then be connected to tap 223, which has still lower voltage than tap 222 (e.g. 8 V), so the light bulb 10 is dimmed to its lowest level. Each further opening and closing of an on/off switch 32, 34 will turn the movable contact 49 further in the clockwise direction. This will first increase the brightness of the light bulb 10 in two steps, and next reduce the brightness again, as the light bulb 10 is sequentially switched between taps 221, 222, 223, 222, 221, etc.

The combination of taps 221, 222, 223 on the secondary winding 22 of transformer 20, a switching device 40, and a stepping motor 50 serving as a control device for the switching device thus makes it possible to vary the voltage applied to the light bulb 10, and thereby the brightness of the light bulb 10, simply by flicking on and off again either a remote mounted on/off switch 32, or a lamp mounted on/off switch 34. Remote controlled dimming of the light bulb 10 is thus made possible without the addition of any special remote control device.

It should be noted that the entire dimming apparatus can be housed in the lamp armature, so the dimming function follows the lamp when it is moved from one wall outlet to another, but remote control is still possible whenever there is a remote switch for turning the lamp on and off. This is an important advantage over conventional remote control dimmers, which can be operated only by one permanently installed control potentiometer.

The state of the dimmer apparatus illustrated in FIG. 1 is not known by the operator. When power is initially connected to the light bulb 10, the position of the movable contact 49 in the rotary switch 40 is unknown, and repeated dimming action never brings the dimming circuit to a predetermined end position. The operator can thus ascertain the dimming level only by observing the brightness of the lamp, and variations in ambient light level might sometimes make it difficult to determine with certainty when the lamp is at full voltage. This is a disadvantage when the apparatus is used for dimming of a halogen lamp. The quartz bulb in a halogen lamp will gradually darken from deposits from the filament when the light bulb is operated at reduced voltage, but such dark deposits will revert back to the filament when the light bulb burns at rated voltage. It is thus necessary to run a halogen lamp at full brightness from time to time in order to obtain optimum performance and bulb life. To ensure this, a dimmer apparatus for a halogen lamp should preferably have a positively predetermined full voltage state.

A predetermined starting point for the rotary switch 40 can be obtained by using an initializing means for setting the switch 40 to a predetermined position after a long period without power. Such initializing means will include mechanical clutches or similar devices when a rotary switch is used as switching device 40. Initialization is easier to arrange in purely electric or electronic embodiments of the invention, as will be described below.

Figure 2:
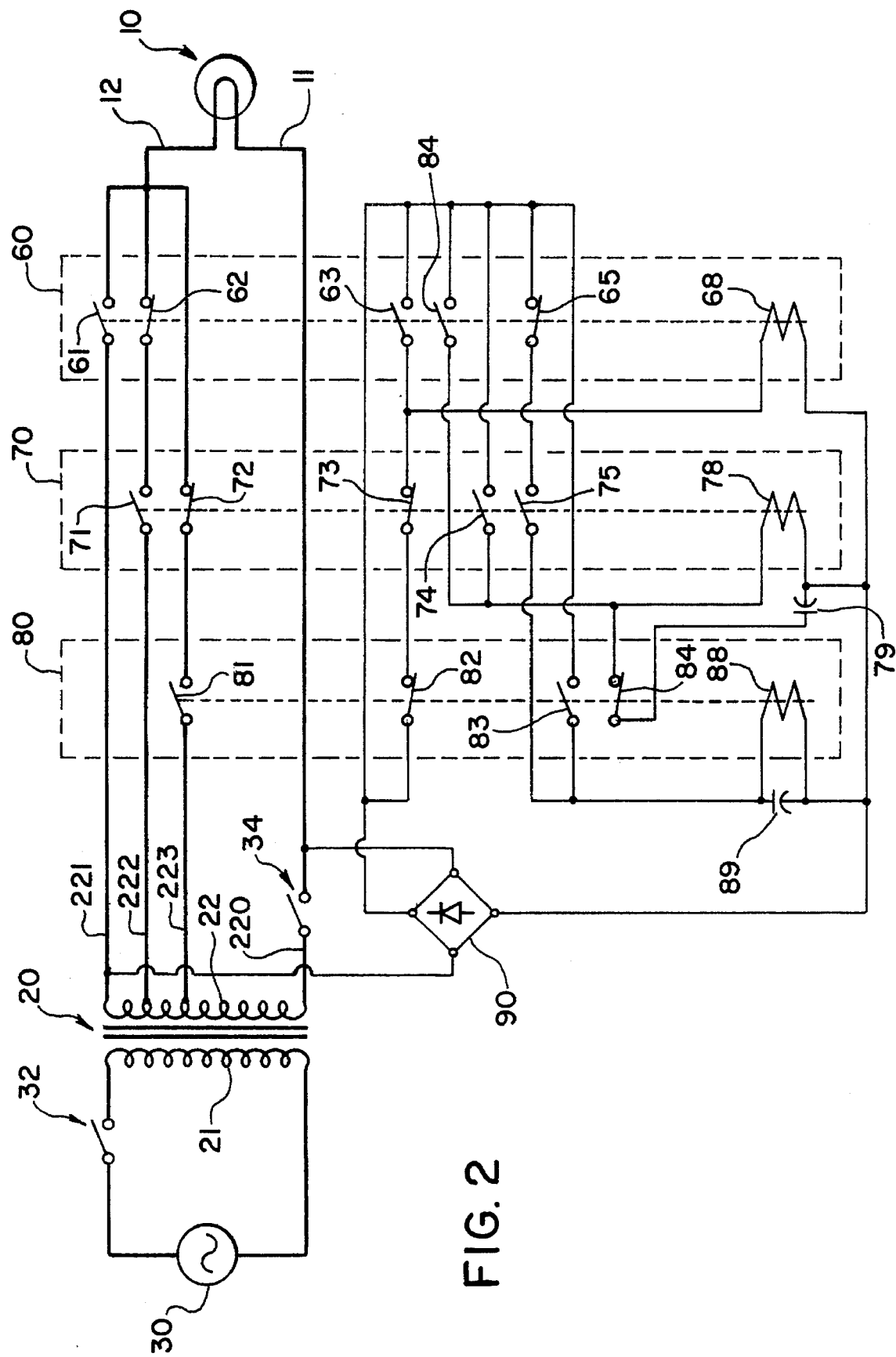
FIG. 2 is a schematic diagram for a device according to a preferred embodiment of the invention for dimming of a low voltage lamp using relay logic.

FIG. 2 is a schematic for a second preferred embodiment of an apparatus according to the invention for applying a variable voltage to an electric load. The electric load is again shown as a low voltage light bulb 10, which is supplied with household power 30 via a transformer 20 and two on/off switches 32, 34. The secondary winding 22 of transformer 20 again has three taps 221, 222, and 223, which alternately can be connected to the light bulb 10 via a remote controlled switching device.

The second embodiment according to FIG. 2 differs from the previously described first preferred embodiment in the construction of the switching device and in the control device. In the embodiment illustrated in FIG. 2, the switching device and its control device are combined in a set of three relays 60, 70, and 80. The control function for the switching device is based on relay logic, comprising coils 68, 78, 88 and auxiliary contacts on the relays 60, 70, 80, plus a rectifier 90 and capacitors 79 and 89.

The rectifier bridge 90 is supplied with AC voltage from tap 221 on the secondary winding 22 of transformer 20 and terminal 11 of the light bulb 10, so it delivers DC power to relays 60, 70, 80 only when power is applied to the light bulb 10. The DC output from the rectifier bridge 90 is used to energize the coils 68, 78, 88 of relays 60, 70, 80 via auxiliary contacts on the relays.

When either or both of the on/off switches 32, 34 are in the off position, the light bulb 10 is off, and no AC voltage is supplied to rectifier 90, so all three relays 60, 70, 80 are de-energized. As soon as both switches 32, 34 are turned on, power is supplied to the AC terminals of rectifier 90, and coil 68 on relay 60 is energized via normally closed contacts 73 and 82 on relays 70 and 80. When relay 60 closes, a normally open contact 61 on relay 60 closes and connects terminal 12 on light bulb 10 to the full voltage tap 221 on transformer 20, so the lamp will shine with full brightness. At the same time, an auxiliary contact 63 connects coil 68 to the +terminal of rectifier 90, so relay 60 latches in the energized state.

When relay 60 closes, coil 78 of relay 70 will be energized via a contact 64 on relay 60. When relay 70 closes, it latches in its energized state via a contact 74, so it will remain on even when relay 60 is later de-energized. A contact 71 on relay 70 closes, but normally closed contact 62 on relay 60 is now open, so terminal 12 on light bulb 10 remains isolated from tap 222 on the transformer 20.

When power to the light bulb 10 is interrupted by means of either of switches 32, 34, DC voltage to coil 68 in relay 60 is interrupted, and relay 60 immediately reverts to its off state. DC power to coil 78 in relay 70 is also interrupted, but this coil 78 is shunted by a capacitor 79, which delays the opening of relay 70 for a fraction of a second. If the on/off switches 32, 34 are closed again before relay 70 opens, terminal 12 of light bulb 10 will be connected to tap 222 on transformer 20 via relay contacts 71 and 62, and the lamp will be dimmed by one step.

After relay 60 becomes de-energized, while relay 70 remains energized, coil 88 in relay 80 will be energized via relay contacts 75 and 65. After relay 80 closes, it will self-hold via contact 83, and contact 84 will open so capacitor 79 is disconnected from coil 78 in relay 70. Contact 81 will close, but contact 72 in relay 70 is open, so terminal 12 of light bulb 10 remains disconnected from tap 223.

When power to the light bulb 10 is interrupted a second time by means of either of switches 32, 34, the DC voltage to relay coils 78 and 88 is also interrupted. Coil 78, which no longer is shunted by capacitor 79, will be de-energized, so relay 70 immediately reverts to its off state, but coil 88 in relay 70 is permanently shunted by a capacitor 89, so the opening of relay 78 is delayed for a fraction of a second. If the on/off switches 32, 34 are closed again before relay 80 opens, terminal 12 of light bulb 10 will be connected to tap 223 on transformer 20 via relay contacts 81 and 72, and the lamp will be dimmed by a second step.

Further brief interruptions of power to light bulb 10 will not change the state of any of the relays 60, 70, 80. Light bulb 10 will remain dimmed by two steps until power is interrupted for a period of time longer than the delay time of coil 88 with capacitor 89. When power is restored after such a sufficiently long delay, the apparatus will revert to the first step in the dimming process described above, and the light bulb 10 will again shine with full brightness.

This second preferred embodiment of the invention ensures that the lamp brightness is predetermined both at initial turn-on and after repeated dimming requests. This makes it simple to assure that a halogen light bulb can be operated at full brightness often enough to avoid premature blackening of its quartz bulb.

The dimmer apparatus according to the embodiment of the invention shown in FIG. 2 is based on relay logic, which is easy to understand for any electrical engineer. Those skilled in the art of solid state circuits will, however, readily understand that equivalent functions can be built from commercially available solid state logic components, e.g., either discrete components, such as transistors and diodes, or large scale integrated circuits.

Figure 3:
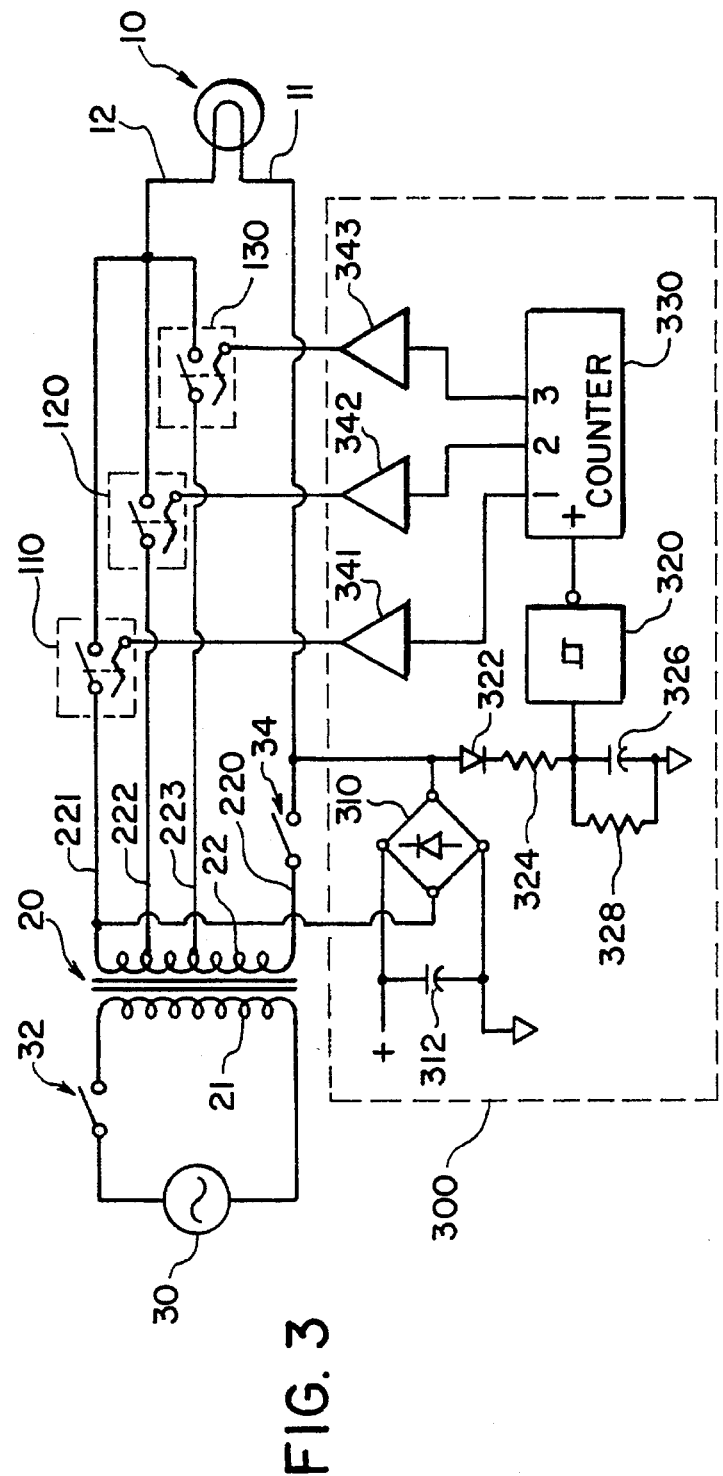
FIG. 3 is a simplified schematic diagram for a device according to a preferred embodiment of the invention for dimming of a low voltage lamp using a solid state counter as a control device.

FIG. 3 is simplified schematic for a third preferred embodiment of an apparatus according to the invention based on integrated solid state logic components. A low voltage lamp 10 is supplied by household AC power 30 via a transformer 20 with a plurality of secondary taps 221, 222, 223, and two on/off switches 32, 34, as described above with reference to the embodiments of FIGS. 1 and 2. One terminal 12 of the light bulb 10 is connected to alternate taps 221, 222, 223 by means of a switching device comprising switches 110, 120, and 130. The switches 110, 120, 130 are shown as mechanical switches operated magnetically, but solid state switches can be used instead, as is well known in the art. The switches 110, 120, 130 are operated by an electronic control device 300 comprising buffers 341, 342, 343 controlled by a counter 330 with outputs 1, 2 and 3. Power to the counter 330 and associated logic circuits is obtained from a rectifier bridge 310 with a large filter capacitor 312. The AC terminals of the rectifier bridge are connected to tap 221 on transformer secondary winding 22 and to terminal 11 of the light bulb 10, so AC voltage is provided to the rectifier bridge 310 only when the light bulb 10 is powered.

The input to the counter 330 is connected to the output terminal of a schmitt trigger 320 with NOR output, so the counter 330 receives an input signal 1 when the schmitt trigger 320 is in an OFF state. The counter 330 is initiated to start at 1 on initial power on after a long power interruption, and it steps up one step each time an input signal 1 is received. Counters with these characteristics are well known in the art.

The input terminal of the schmitt trigger 320 is connected to one of the AC terminals in the rectifier bridge 310 via a diode 322 and a resistor 324. A small capacitor 326 with parallel resistor 328 is connected between the schmitt trigger 320 input and the common terminal for the logic circuits, which is the minus terminal of the rectifier bridge 310. The time constant of the RC circuit 326, 328 should be in the order of one cycle of the AC power 30. When lamp 10 power is on, the voltage at the AC terminal of rectifier 210 varies between common voltage (−) and full +voltage once per period of the household AC power 30. This alternating voltage is peak rectified by diode 322 and capacitor 326, so the input voltage to the schmitt trigger 320 is a positive DC voltage. The schmitt trigger 320 accordingly remains on, and the logic input to the counter 230 remains 0 as long as power to the lamp is on.

When power is first turned on by closing of both on/off switches 32, 34, both the capacitor 312 after the rectifier 310 and the capacitor 326 at the input of the schmitt trigger 320 are charged to full DC voltage within one cycle of the AC power 30. The counter 330 is initiated to output 1, and the schmitt trigger is in ON state, so the logic input to the counter is 0. Switch 110 will accordingly close, so terminal 12 of light bulb 10 is connected to tap 221 on the secondary winding 22 of transformer 20, which provides full lamp brightness.

If power to the lamp 10 is interrupted by either of the on/off switches 32, 34, AC voltage will disappear from the AC terminals of rectifier 310, and the input voltage to the schmitt trigger 320 will decrease rapidly as determined by the time constant of the RC circuit 326, 328. The supply power to the electronic circuits will, however, be maintained by the large filter capacitor 312 for a few tenths of a second. When the input to the schmitt trigger 320 drops below the OFF level, a logic 1 signal appears on the input to the counter 330. This steps the counter 330 to output 2, which causes switch 110 to open and switch 120 to close, so terminal 12 in the light bulb 10 is moved from tap 221 to tap 222. If power is restored before the voltage on capacitor 312 drops below the operating limit for the electronics, the light bulb 10 will receive voltage from tap 222, which means the lamp has been dimmed by one step.

A second brief interruption of power to the lamp will similarly cause the counter 330 to step to position 3, and the light bulb 10 will be dimmed by two steps.

Further interruptions in power to the lamp will not affect the output of the counter 330 as described, so the light bulb will remain at minimum voltage, unless a subsequent power interruption is long enough to reset the electronics to the initial power-on state.

Those skilled in the art will realize that if desired, the counter 330 may easily be arranged to restart at output 1 after it has reached output state 3, or to start counting down after it has reached output state 3, instead of remaining locked at output 3 as contemplated above.

All of the embodiments described above show three taps 221, 222, 223 on the secondary winding 22 of transformer 20. This corresponds to three different light levels for the light bulb 10, which often is a suitable number of dimming levels. Those skilled in the art, however, will realize that two steps, or more than three steps, can easily be accommodated according to the invention by subtracting one tap or adding additional taps on the secondary winding 22 of transformer 20, while providing a number of states in the switching device corresponding to the number of taps on the transformer secondary winding 22. In the apparatus shown in FIG. 1, more steps require only more fixed contacts on the rotary switch 40, and a stepper motor 50 with smaller angular steps. In the apparatus illustrated in FIG. 2, more taps can be accommodated by adding clones of relay 70 to the relay logic. Relay 60 would remain for connecting the light bulb 10 to the highest voltage tap 221, and relay 80 would remain for connecting the light bulb 10 to the new lowest voltage tap on transformer 20. In the apparatus illustrated in FIG. 3, more steps would require that more switches like 110, 120, 130 and buffers like 341, 342, 343 be added, and that a counter 330 capable of counting beyond 3 would be used. If only two taps are used, the counter 330 can be replaced by a flip-flop.

It will also be evident to those skilled in the art that the dimming sequence can be reversed, i.e. the first dimming step can be made minimum light intensity instead of maximum, by simply reversing the order of the taps 221, 222, 223 when they are connected to the switches for tap selection, i.e. switches 42–44 in FIG. 1, or switches 61, 71, 81 in FIG. 2, or switches 110, 120, 130 in FIG. 3.

There are numerous advantages of an apparatus according to the invention over known dimmer devices.

In a conventional halogen lamp, the transformer 20 would have only one secondary tap 221, and the light bulb 10 would be connected in series with switch 34 between the end lead 220 and the single tap 221 on the secondary winding 22. Dimming would be accomplished by installing a triac in series with the AC circuit on the primary of the transformer 20 and controlling dimming level by changing the conduction angle of the triac by means of a control potentiometer or a multi-step switch. The dimmer potentiometer and the triac can be located either remotely from the lamp near the wall switch 32, or in the lamp armature. In either case, the dimming can only be controlled from the control potentiometer. Thus, if the dimmer potentiometer and the triac are located in the lamp armature, remote control is not possible, and if the dimmer potentiometer and the triac are located remotely, dimming will be possible only when the lamp is connected to a wall outlet controlled by the dimmer potentiometer and the triac. It is not possible to control a conventional dimmer both from the lamp armature and from the wall switch, as is possible at no extra cost for a dimmer apparatus according to the invention.

A triac based conventional dimmer can not be used with a toroidal transformer, which is the preferred type of transformer for halogen lamps because of its shape and small size and weight compared to conventional transformers. The reason is that a triac with conduction angle control always generates a small DC component in series with AC current in the transformer 20, and a toroidal transformer, which has an air gap free core, suffers from mechanical hum when the AC voltage includes a DC component. In a dimmer apparatus according to the invention, the switches are either steadily closed or steadily open, so it is easy to avoid generation of DC components even when solid state switches are used. Therefore, dimmer apparatus according to the invention do not cause hum in a toroidal transformer.

The cost for a conventional dimmer arrangement includes the cost for a triac with angle control circuits, a separate control potentiometer, plus high frequency filters for noise abatement.

The cost for a dimmer apparatus according to the invention includes the cost of extra taps 222, 223 on the secondary 22 of an existing transformer 20, plus the cost of a switching device with control circuits. The cost of extra taps on an existing transformer is negligible, and the cost of a switching device with associated control device is today low, especially when solid state technology is used. The cost for a dimming apparatus according to the invention is, accordingly, competitive with the cost of a conventional dimmer apparatus, in spite of the many advantages offered by the invention.

The embodiments of the invention described above with reference to FIGS. 1–3 use different hardware and circuits, but those skilled in the art will readily understand that they are all based on a common principle for applying a variable voltage to an electrical load supplied from the secondary winding of a transformer: Several taps are provided on the secondary winding, switching means are provided for connecting the load alternatively to the different taps available, and the switching means are operated by brief interruptions in the power supply to the load.

The present invention is not limited to any details in the description above or in the figures used to illustrate different embodiments of the invention. It would, for instance, be possible to use spring loaded push buttons to generate short interruptions in power, instead of conventional on/off power switches, as contemplated in FIGS. 1–3 and the description above, and the invention does not require two different on/off switches.

It is intended that the invention shall cover all variations within the scope of the appended claims and their equivalents and without limitation to the different environments.

I claim:

1. Apparatus for applying a variable voltage to an electric load, comprising:

(a) a transformer having a plurality of secondary taps; and (b) switching means having a plurality of states for connecting the electric load to alternate said taps, said switching means being responsive to short interruptions in power supplied to said load for changing its state.

2. Apparatus according to claim 1, further comprising:

a power switch in circuit with said load, whereby said state of said switching means can be changed by opening and closing said power switch.

3. Apparatus according to claim 1, further comprising:

means for resetting said switching means to a predetermined state after a long interruption of the power supply to said load.

4. Apparatus according to claim 1, wherein said switching means comprises a stepping motor.

5. Apparatus according to claim 1, wherein said switching means comprises an electronic logic circuit.

6. Apparatus according to claim 1, wherein said switching means comprises a plurality of mechanical switches.

7. Apparatus according to claim 1, wherein said switching means comprises a plurality of electronic power switching devices.

8. Apparatus for applying a variable voltage to an electric load supplied from a power source including an on/off switch, comprising:

(a) a transformer having a secondary winding with a plurality of taps;

(b) a switching device having plural states for connecting said load to alternate said taps;

(c) a control device for operating said switching device, said control device being responsive to short interruptions in the power supplied to said lamp caused by a brief opening of said on/off switch for changing the state of said switching device.

9. Apparatus according to claim 8, further comprising:

means for resetting said switching device to a predetermined state after a long interruption of power.

10. Apparatus for dimming a halogen lamp supplied by power via a low voltage secondary winding in a transformer, comprising:

(a) a plurality of taps on said secondary winding;

(b) a switching device having a plurality of states for connecting the lamp to alternate said taps; and (c) a control device for changing the state of said switching device, said control device responding to short interruptions in said power.

11. Apparatus according to claim 10, further comprising:

means for interrupting the power supply to the lamp briefly to induce said control device to change the state of said switching device.

12. Apparatus according to claim 10, further comprising:

means for resetting said switching device to a predetermined state after a long interruption of the power supply to said lamp.

13. Apparatus according to claim 10, wherein said control device comprises a stepping motor.

14. Apparatus according to claim 10, wherein said control device comprises relay logic.

15. Apparatus according to claim 10, wherein said control device comprises electronic logic circuit elements.

16. Apparatus according to claim 10, wherein said switching device comprises a plurality of mechanical switches.

17. Apparatus according to claim 10, wherein said switching device comprises a plurality of electronic power switching devices.

18. Apparatus according to claim 10, wherein said transformer is of toroidal design.

* * * * *